Dec. 15, 1925.
A. G. KUYKENDALL
1,565,471
METHOD OF HEATING HONEY
Filed April 7, 1924
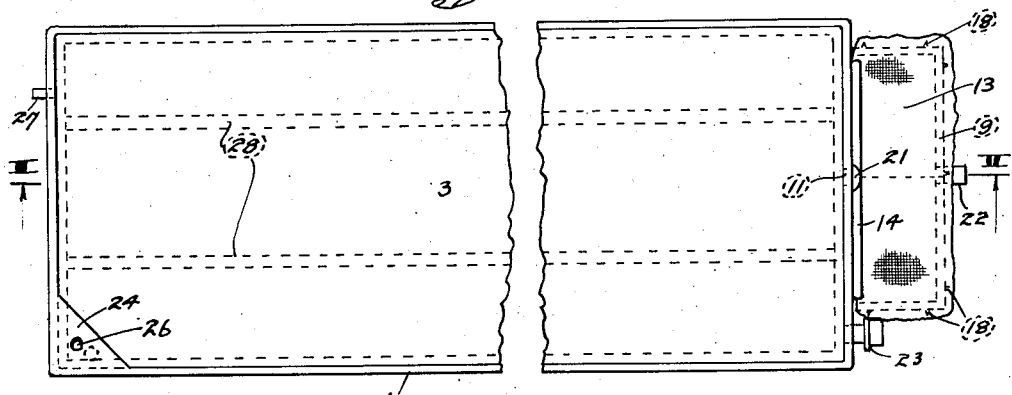
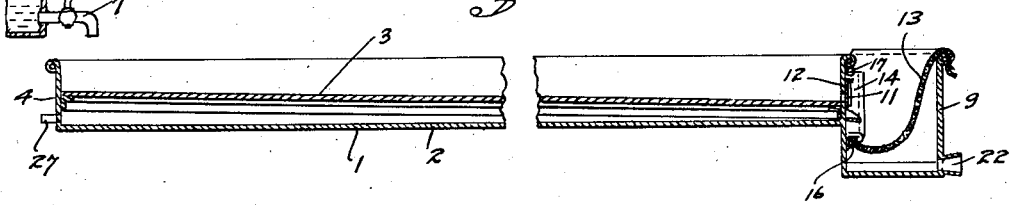
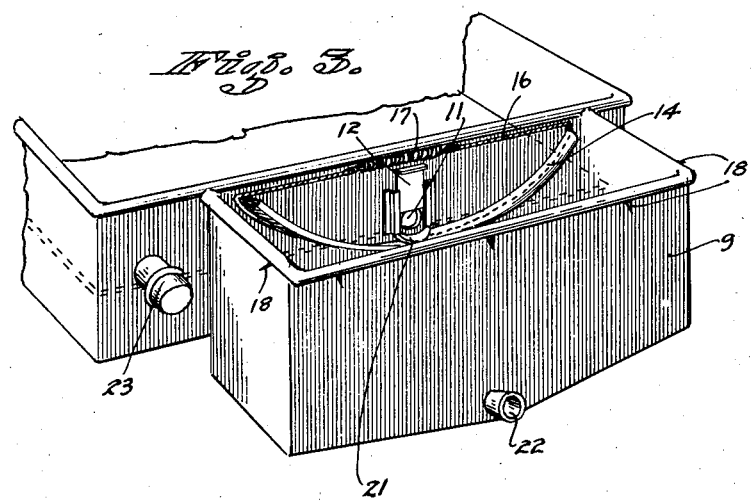
Inventor
ALECK G. KUYKENDALL
By
Attorneys.

Patented Dec. 15, 1925.

1,565,471

UNITED STATES PATENT OFFICE.

ALECK G. KUYKENDALL, OF LA MESA, CALIFORNIA.

METHOD OF HEATING HONEY.

Application filed April 7, 1924. Serial No. 704,842.

*To all whom it may concern:*

Be it known that I, ALECK G. KUYKENDALL, a citizen of the United States, and a resident of La Mesa, San Diego County, State of California, have invented a new and useful Method of Heating Honey, of which the following is a specification.

The present invention relates to improvements in a method for heating honey and in means for carrying out the method. Honey is heated to maintain the same in a semi-fluid state and to prevent granulation of the same. At the present time the honey is usually heated in bulk and it is considered best practice, in fact it is recommended by the Government, that the honey be not heated above a temperature of 156° Fahrenheit, since in the present method of heating the honey loses its color and becomes dark when this temperature is exceeded.

One method used at the present time is to place cans filled with honey in a heated room and to cause it to gradually heat to the temperature of about 156° and thereafter to allow the honey to cool. This slow process has the disadvantage of cooking the honey to a certain extent, which is detrimental to the same. It furthermore prevents the operator from exceeding a comparatively low temperature, since otherwise the cooking effect would spoil the honey.

It is a fact that honey heated to a low temperature only will soon granulate, while honey heated to a higher temperature will remain in a semi-fluid condition for a considerable period. The object of the present invention is to provide a method allowing the honey to be heated to a higher temperature without any detrimental effects.

The preferred form of my invention is illustrated in the accompanying drawing, in which Figure 1 shows a top plan view of my device, Figure 2 a longitudinal section through the same taken along line II—II of Figure 1, and Figure 3 a perspective view of one end of the same. While I have shown only the preferred form of the invention, I wish to have it understood that various changes or modifications may be made within the scope of the claims hereto attached without departing from the spirit of the invention.

My device comprises a vessel (1) consisting of a flat bottom (2) and top (3) disposed in slanting relation to the same and flanges (4) providing a wall for the vessel and extending above the top plate (3) so as to additionally provide a retaining wall for honey that may be passed over the top plate. The vessel is filled with water which may be heated to a desired temperature by any suitable means, not shown in the drawing.

Near the upper end of the vessel is supported a receptacle (6) for the honey with a pipe (7) discharging upon the top of the vessel and a valve (8) controlling the flow. At the lower end of the vessel is provided a receptacle (9) into which honey flowing over the top of the plate (3) may be discharged through a perforation (11). The port area of this perforation is controlled by means of a sliding gate (12).

To strain the honey I preferably provide a piece of cloth (13) clamped to arc-shaped flange (14) extending from the end of the vessel by means of a cord (16) and a spring (17) joining the ends of the cord. The material of the cloth is folded over the edges of the receptacle (9) and held in place by means of pointed pins (18) secured to the edge of the receptacle. A small lip (21) guides the honey over the flange (14). A port (22) allows the honey to be withdrawn from the receptacle (9).

A capped outlet (23) is provided to allow the top plate to be flushed and the water used for this purpose to drain off. A small expansion chamber (24) is preferably provided in one of the upper corners of the device and formed with a perforation (26) allowing overflow water to pass therethrough. For draining the tank I provide a pipe (27).

To use the device, heat is applied to the bottom of the vessel until the water in the vessel reaches a temperature allowing honey to flow over the top plate to be heated to 175 or 180°. Since it is normally considered that 156° is about the highest temperature that honey can stand without turning black, any higher temperature will be referred to in the claims as being excessive; and it should be understood that this expression means any temperature normally considered in excess of what is thought permissible at the present time.

After this temperature has been reached the faucet (8) is opened and honey allowed to be discharged on the top plate (3). The honey will rapidly become thin and will flow over the top plate until it reaches the bottom end, when it will discharge through the aperture (11) into the receptacle (9). The advantage of this method is that the honey heats rapidly and is exposed to the heating medium for a short period of time only and is allowed to cool immediately thereafter. The cooling process takes place rapidly since the honey is discharged from the lip 21 in a small stream and passes through the atmospheric air upon the strainer where its progress is delayed until it finally joins the comparatively thin layer of honey previously delivered into the receptacle 9.

When heated in this manner, even to a degree above 156° the honey will not lose its color, but will be prepared to resist granulation much longer than honey heated in the ordinary way.

A further advantage of this device is that honey can be handled very economically, since the comparatively small apparatus used by me, which is about five feet long, has a capacity of one ton of honey a day and takes only about three gallons of gasoline for heating.

The slope of the top plate (3) should be arranged so that the honey passes over the entire plate in about one minute.

To prevent the top plate from buckling I provide a plurality of stiffening members (28) extending from end to end and secured to the underface of the top plate.

I claim:

1. The method of preserving honey which consists in subjecting a thin sheet thereof to excessive heat for a brief period.

2. The method of preserving honey which consists in subjecting a thin sheet thereof to excessive heat for a brief period and in rapidly cooling the same thereafter.

3. The method of preserving honey which consists in causing the honey to travel in the form of a thin sheet while subjecting the same to excessive heat for a brief period.

ALECK G. KUYKENDALL.